US009247406B2

(12) United States Patent
Lorenz et al.

(10) Patent No.: US 9,247,406 B2
(45) Date of Patent: Jan. 26, 2016

(54) SYNCHRONOUS SOS MESSAGING IN A CELLULAR NETWORK

(71) Applicant: Broadcom Corporation, Irvine, CA (US)

(72) Inventors: Robert Lorenz, Menlo Park, CA (US); Djordje Tujkovic, Mountain View, CA (US); Erik Stauffer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 178 days.

(21) Appl. No.: 13/835,318

(22) Filed: Mar. 15, 2013

(65) Prior Publication Data

US 2014/0148118 A1    May 29, 2014

Related U.S. Application Data

(60) Provisional application No. 61/731,154, filed on Nov. 29, 2012.

(51) Int. Cl.
| | |
|---|---|
| *H04M 11/04* | (2006.01) |
| *H04W 4/22* | (2009.01) |
| *H04W 52/02* | (2009.01) |
| *H04W 76/00* | (2009.01) |

(52) U.S. Cl.
CPC ............ *H04W 4/22* (2013.01); *H04W 52/0209* (2013.01); *H04W 76/007* (2013.01); *Y02B 60/50* (2013.01)

(58) Field of Classification Search
CPC .................. H04W 4/00–4/006; H04W 4/008; H04W 4/22; H04W 8/00–8/245; H04W 4/02–4/046; H04W 40/20; H04W 60/00; H04W 64/00

USPC .................. 455/404.1, 456.1–457, 458, 466, 455/11.1–13.1, 552.1, 553.1; 370/310.2, 370/312, 324

See application file for complete search history.

(56) References Cited

U.S. PATENT DOCUMENTS

| | | | | |
|---|---|---|---|---|
| 5,231,632 | A * | 7/1993 | Yamao et al. ................. | 370/331 |
| 6,801,762 | B1 * | 10/2004 | Huilgol ...................... | 455/404.1 |
| 7,570,951 | B2 * | 8/2009 | Classon et al. ................ | 455/437 |
| 7,768,977 | B2 * | 8/2010 | Camp, Jr. ...................... | 370/332 |
| 8,095,175 | B2 * | 1/2012 | Todd et al. ................. | 455/552.1 |
| 8,233,091 | B1 * | 7/2012 | Rabinowitz et al. .......... | 348/554 |
| 8,265,551 | B2 * | 9/2012 | Saito et al. ...................... | 455/23 |
| 8,285,201 | B2 * | 10/2012 | Gore et al. ................... | 455/11.1 |

(Continued)

*Primary Examiner* — Steve D Agosta
(74) *Attorney, Agent, or Firm* — Sterne, Kessler, Goldstein & Fox P.L.L.C.

(57) ABSTRACT

Embodiments provide methods and systems for transmitting an emergency (SOS) message from a user (UE) to a cellular network in a highly robust and energy efficient manner. Specifically, embodiments enable the SOS message to be sent in a synchronous manner despite the asynchronous nature of the network, which significantly enhances the probability of successful reception of the SOS message by at least one base station (eNodeB) of the network. Embodiments further provide highly robust SOS message transmission and reception schemes configured to enhance the successful detection and decoding of the SOS message by at least one base station of the cellular network. In addition, embodiments enable the synchronous transmission of the SOS message to the network without requiring network attachment by the UE. This makes embodiments highly suited for emergency situations in which network coverage is affected and can enable significant and precious power savings at the UE.

8 Claims, 9 Drawing Sheets

(56) References Cited

U.S. PATENT DOCUMENTS

| 8,811,339 B2* | 8/2014 | Fong et al. | 370/331 |
| 2005/0153736 A1* | 7/2005 | Ganton | 455/553.1 |
| 2010/0173602 A1* | 7/2010 | Muramatsu | 455/404.1 |
| 2012/0020191 A1* | 1/2012 | Shemesh | 368/47 |
| 2012/0105277 A1* | 5/2012 | Ling et al. | 342/357.2 |

* cited by examiner

SYNCHRONOUS SOS MESSAGING IN A CELLULAR NETWORK

CROSS-REFERENCE TO RELATED APPLICATIONS

The present invention claims the benefit of U.S. Provisional Application No. 61/731,154, filed Nov. 29, 2012, which is incorporated herein by reference in its entirety.

The present application is related to U.S. application Ser. No. 13/838,620, filed Mar. 15, 2013, titled "Emergency (SOS) Mode Enhancements for Cellular Networks", which is incorporated herein by reference in its entirety

BACKGROUND

1. Field of the Invention

The present disclosure relates generally to emergency (SOS) messaging in wireless access communication networks.

2. Background Art

Emergency situations commonly occur around the globe, putting a large number of lives at risk. A cellular network offers a unique and important opportunity to protect people during times of crisis and emergency. The 3$^{rd}$ Generation Partnership Project (3GPP) offers an Earthquake and Tsunami Warning System (ETWS), which enables delivery of critical information to User Equipments (UEs) within the cellular coverage zone, drastically reducing the amount of time required to warn users of an impending disaster.

While the ETWS system is able to distribute emergency and early warning information before a disaster, it does not enable delivering emergency information in the reverse direction, from a UE to the network, which would allow a user to identify itself as in need of emergency assistance. One design challenge is that network coverage is commonly poor in the location where the emergency event occurs (e.g., due to infrastructure being damaged due to the emergency event, or if the emergency event occurs at the radio cell edge or outside of the coverage area).

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

In the following disclosure, terms defined by the Long-Term Evolution (LTE) standard are sometimes used. For example, the term "eNodeB" is used to refer to what is commonly described as base station (BS) or base transceiver station (BTS) in other standards. The term "User Equipment (UE)" is used to refer to what is commonly described as a mobile station (MS) or mobile terminal in other standards. However, as will be apparent to a person of skill in the art based on the teachings herein, embodiments are not limited to the LTE standard and can be applied to other wireless communication standards.

Figure 1:
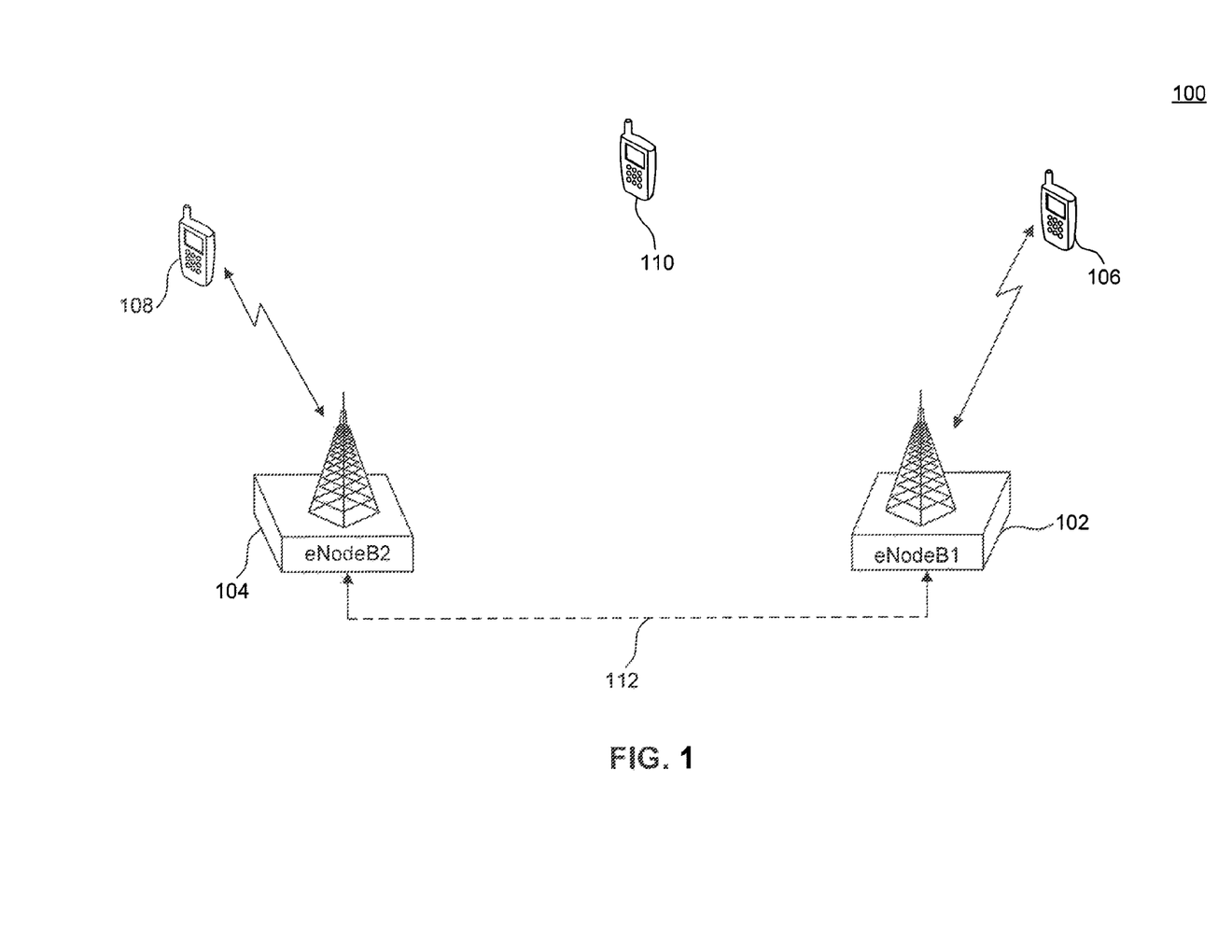
FIG. 1 illustrates an example environment in which embodiments can be used or implemented.

FIG. 1 illustrates an example LTE cellular network environment 100 in which embodiments can be used or implemented. Example cellular network environment 100 is provided for the purpose of illustration only and is not limiting of embodiments. As will be apparent to a person of skill in the art, embodiments are not limited to LTE or to cellular networks and may be applied to other types of cellular communication standards and/or wireless access communication networks.

As shown in FIG. 1, example network environment 100 includes a first Evolved Node B (eNodeB) 102 (eNodeB 1), a second eNodeB 104 (eNodeB 2), and User Equipments (UEs) 106, 108, and 110. eNodeB 102 and eNodeB 104 may communicate via a backhaul network (e.g., X2 interface) link 112. UEs 106, 108, and 110 can be any wireless device capable of cellular-based communication, including a cellular phone, tablet, laptop, etc. eNodeBs 102 and 104 may each support a plurality of cells (each cell is the equivalent of a base station and has a unique cell ID that identifies it to UEs). Depending on its receiver capabilities, a UE may communicate with one or more cells of eNodeB 102 and/or eNodeB 104.

For the purpose of illustration of embodiments, it is assumed that UE 106 is served by a cell located at eNodeB 102 and that UE 108 is served by a cell located at eNodeB 104. This means that UEs 106 and UE 108 are attached to the cellular network, including being able to receive and decode the downlink control channels of their respective serving cells (within a predetermined period of time defined by the relevant communication standard) and to synchronize themselves with their respective serving cells. In LTE, for example, synchronization between a UE and an eNodeB includes the UE performing time and frequency synchronization with the eNodeB to determine an OFDM (Orthogonal Frequency Division Multiplexing) symbol timing, a coarse carrier frequency offset, a fine carrier frequency offset, and a LTE begin of frame (BOF) from a primary synchronization signal (PSS) and a secondary synchronization signal (SSS) broadcast by the eNodeB. Typically, the PSS and SSS signals have low processing gain associated with them, which makes synchronization difficult for the UE in the presence of interference and/or beyond the cell edge.

UE 110 is assumed to be located in a geographic location where it is unable to attach itself to the cellular network (e.g., geographic location with low network coverage and/or high interference). This means that UE 110 is unable to receive the downlink control channel of any cell (at eNodeB 102 or eNodeB 104) with sufficient signal strength to be able to decode it successfully within a predetermined period of time defined by the relevant communication standard (e.g., LTE). As a result, UE 110 is unable to synchronize itself with the cellular network. UE 110 is further assumed to be experiencing an emergency situation, for which UE 110 desires to send an emergency (SOS) message to the network.

Generally, cellular networks are asynchronous access communication networks, with no time synchronization among base stations or between UEs vying to access the network. This means that generally downlink transmissions from a base station can cause interference at a UE served by another base station. Furthermore, uplink transmissions from a UE can generally cause interference at a non-serving base station. In addition, UEs generally compete with each other for access to the network before attaching to the network. For example, two UEs vying to attach to the same base station can interfere with each other if their Random Access Channel (RACH) messages collide at the base station.

As a result of the above described asynchronous nature of cellular networks, UE 110 is highly unlikely in the scenario described above in FIG. 1 to be able to successfully send the SOS message to the network. Specifically, without attachment and synchronization to the network, the SOS message from UE 110 is a high probability to collide at eNodeB 102 with uplink transmissions from UE 106, for example, and at eNodeB 104 with uplink transmissions from UE 108, for example. Furthermore, even if UE 110 was able to synchronize itself to eNodeB 102, for example, such that interference from UE 106 is reduced, the SOS message from UE 110 to eNodeB 102 can still be hampered by interference from other UEs. For example, UE 108, which is served by eNodeB 104, can still be assigned the same or overlapping time/frequency resources as those assigned by eNodeB 102 to UE 110 to transmit the SOS message. This is particularly the case when transmissions from UE 108 and 110 arrive at eNodeB 102 at comparable powers such that eNodeB 102 cannot treat the transmission of UE 108 as noise relative to the transmission of UE 110.

Embodiments, as further described below, provide methods and systems for transmitting an emergency (SOS) message from a user equipment (UE) to a cellular network in a highly robust and energy efficient manner. Specifically, embodiments enable the SOS message to be sent in a synchronous manner despite the asynchronous nature of the network, which significantly enhances the probability of successful reception of the SOS message by at least one base station (e.g., eNodeB) of the network. Embodiments further provide highly robust SOS message transmission and reception schemes configured to enhance the successful detection and decoding of the SOS message by at least one base station of the cellular network. In addition, embodiments enable the synchronous transmission of the SOS message to the network without requiring network attachment by the UE. This makes embodiments highly suited for emergency situations in which network coverage is affected and can also enable significant and precious power savings at the UE.

As mentioned above, one aspect of embodiments includes enabling synchronous SOS messaging from a UE to a cellular network. In one embodiment, this includes establishing a common notion of time and/or frequency between the UE and the network, without requiring attachment and synchronization by the UE to the network. In particular, one embodiment includes defining a quiet period during which normal transmission by attached UEs to the network is halted. The quiet period is defined in a deterministic fashion relative to a reference time, which is available to both the UE (sending the SOS message) and the network. As such, by mere knowledge of the reference time, the UE can determine the time at which the quiet period occurs, and base stations can time align their quiet periods among each other. In an embodiment, the reference time is related to a GNSS (Global Navigation Satellite System) time and the UE retrieves the reference time from a GNSS receiver present in the UE. The UE can transmit the SOS message (or a portion thereof) such that it is received synchronously with the quiet period by at least one base station. Further, with normal uplink transmission to the network halted during the quiet period (or halted over specific frequency resources assigned to the quiet period), the SOS message can be received successfully with high probability by the network.

Figure 2:
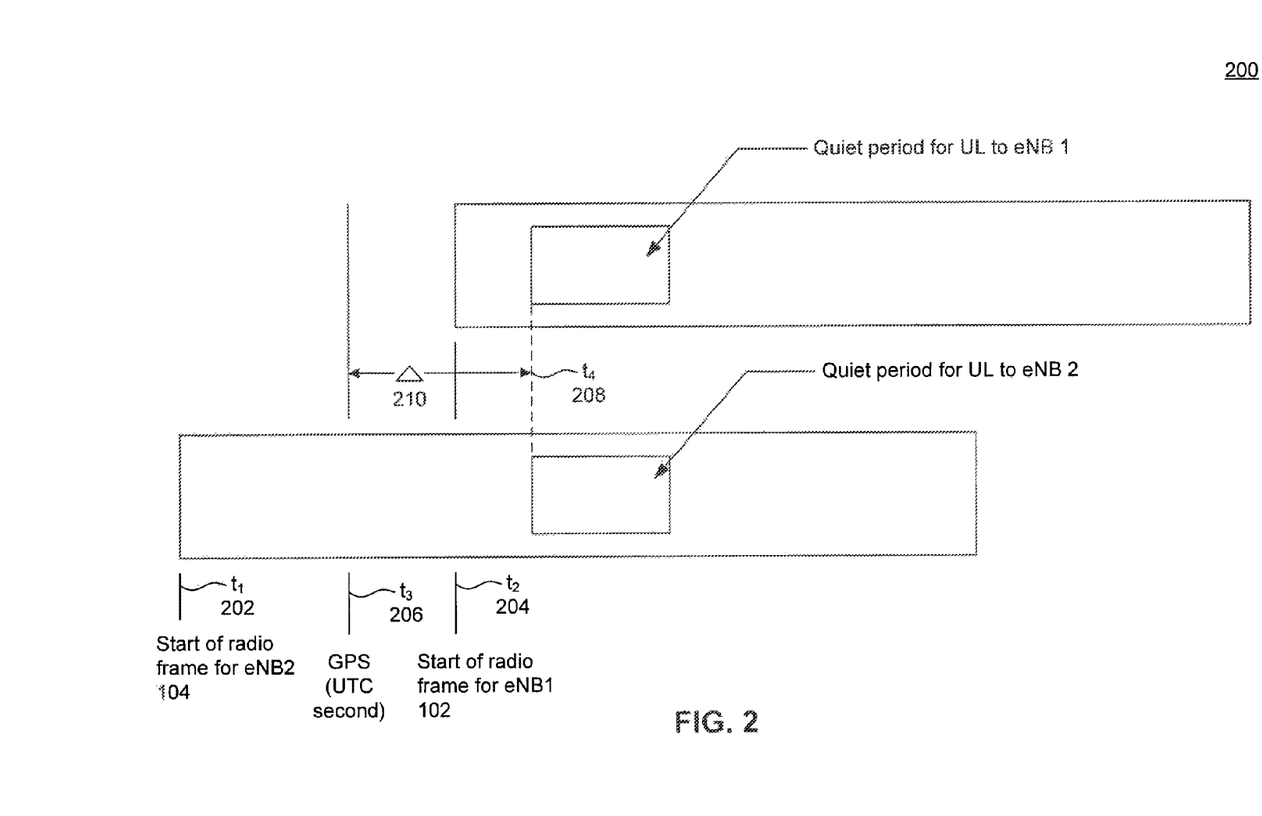
FIG. 2 is an example that illustrates the scheduling of a quiet period according to an embodiment.

FIG. 2 is an example that illustrates the scheduling of a quiet period according to an embodiment. For the purpose of illustration only, the example of FIG. 2 is described with reference to example environment 100 described above. Specifically, FIG. 2 illustrates example uplink radio frames of eNodeB 102 and eNodeB 104 respectively, with a quiet period scheduled within each. As shown in FIG. 2, the radio frames of eNodeBs 102 and 104 begin at times $t_1$ 202 and $t_2$ 204 respectively, which are different because eNodeB 102 and eNodeB 104 are generally not time synchronized. In LTE, for example, the time duration of a radio frame is 10 milliseconds (msec).

Within its respective radio frame, each of eNodeB 102 and eNodeB 104 schedules a quiet period in a deterministic fashion. In the example of FIG. 2, eNodeB 102 and eNodeB 104 each schedules the quiet period to begin at a time $t_4$ 208, which is at a predefined offset $\Delta$ 210 from a GPS reference time instant $t_3$ 206. The GPS reference time instant $t_3$ 206 is pre-agreed upon by the network and can be defined with respect to actual GPS time, which is generally synchronized to UTC. With eNodeBs 102 and 104 each being able to determine separately the occurrence of GPS reference time instant $t_3$ 206, the quiet periods scheduled by eNodeBs 102 and 104 align in time as shown in FIG. 2, without the need for time synchronization between eNodeBs 102 and 104.

The GPS reference time instant $t_3$ 206 can be defined as a function of (e.g., aligned with) the GPS second, half second, 100 msec, 50 msec, or 10 msec, to name a few examples. For illustration, if GPS reference time instant $t_3$ 206 is aligned with the GPS 10 msec, then $t_3$ 206 would occur for example at GPS time=00:00:00:000, 00:00:00:010, 00:00:00:020, etc., thus repeating every 10 msec. The quiet period thus also repeats every 10 msec and occurs once in every radio frame of an eNodeB. In other embodiments, the quiet period, though related to GPS reference time instant $t_3$ 206, does not occur with every occurrence of GPS reference time instant $t_3$ 206 and may or may not be periodic.

As would be understood by a person of skill in the art based on the teachings herein, embodiments are not limited to the use of GPS time for the reference time. Specifically, embodiments can rely on any time for reference as long as the reference time can be determined independently by the UE and base stations in the network. For example, the reference time can be derived from a Global Navigation Satellite System (GNSS) other than GPS, including Galileo, GLONASS, or Beidou. Further, the reference time may be derived by the UE from a non-GNSS based signal. For example, the reference time may be derived from any terrestrial broadcast signal, including an atomic clock broadcast signal, a broadcast radio signal, or a broadcast television signal.

Returning to the example of FIG. 2, before the scheduled quiet period, each of eNodeB 102 and eNodeB 104 signals the quiet period via its respective downlink control channel. In an embodiment, eNodeB 102 and eNodeB 104 each signals the beginning and end times of the quiet period. This causes all UEs served by eNodeBs 102 and 104 and any UE attempting to attach to eNodeB 102 or 104 to refrain from any uplink transmission (including RACH transmissions) to eNodeBs 102 and 104 during the quiet period. In another embodiment, eNodeB 102 and eNodeB 104 each additionally signal specific frequency resources associated with the quiet period. According to embodiments, frequency resources associated with the quiet period can include contiguous or non-contiguous frequencies, and can be configured to reduce unwanted spectral emissions from neighboring frequency resources (e.g., by setting aside excess bandwidth). When the quiet period signaling includes specific frequency resources, UEs refrain from uplink transmission to eNodeBs 102 and 104 during the quiet period over the specific frequency resources associated with the quiet period.

Accordingly, the scheduled quiet period provides an interference-free time interval for UE 110 to transmit an SOS message (or a portion thereof; in an embodiment, the UE uses several quiet periods to fully transmit the SOS message, transmitting a portion of the SOS message during each quiet period) to the network. To send the SOS message, UE 110 aligns its SOS message transmission in time with the scheduled quiet period and/or in frequency with any frequency resources associated with the quiet period.

In an embodiment, UE 110 derives a time estimate of the reference time from a synchronization signal and then schedules its SOS message transmission based on the time estimate such that the SOS message is received synchronously with the quiet period by at least one of eNodeBs 102 and 104. It is noted that UE 110 does not need to know or select which eNodeB receives the SOS message (or even know of the existence of the eNodeB that ultimately receives the SOS message) because the quiet period is aligned across all eNodeBs in the network.

In an embodiment, UE 110 schedules its SOS message transmission to account for an estimated time of flight of the SOS message (or a portion thereof) to the network (the estimated time of flight can be determined statistically from typical signal propagation properties and typical radio cell diameters). For example, UE 110 may be configured to begin transmitting the SOS message some amount of time before the beginning of the quiet period. In another embodiment, the SOS message is configured to have a cyclic prefix (CP) designed to account for the estimated time of flight. In a further embodiment, the time of flight is accounted for by designing the quiet period to be large compared to the estimated time of flight and/or by having the eNodeB attempt to receive the SOS message over various timing offsets from the beginning of the quiet period. In a further embodiment, UE 110 repeats the SOS message in its entirety to give eNodeBs 102 and 104 additional opportunities to avoid interference. For example, at each repetition, UE 110 may adjust its timing so that the SOS message is received within the quiet period. In another embodiment, an eNodeB can attempt to receive over various timing offset hypotheses (from the beginning of the quiet period) and then select the hypothesis that minimizes interference from other eNodeBs. In another embodiment, UE 110 uses prior information regarding the position of an eNodeB to estimate the time of flight and can advance its transmission time to ensure the SOS message is received within the quiet period at the eNodeB.

In addition to aligning its SOS message transmission with the scheduled quiet period, in an embodiment, UE 110 further ensures that the SOS message transmission is frequency synchronized with the frequency resources associated with the quiet period. This enables large processing gains at the eNodeB that receives the SOS message by allowing the eNodeB to reduce a number of frequency bins that needs to be searched to detect the SOS message transmission and to perform coherent averaging over multiple time slots (e.g., multiple quiet periods) thereby resulting in a linear increase of signal-to-noise ratio (SNR) as a function of time. In an embodiment, UE 110 frequency calibrates a local oscillator used to produce transmit frequencies with a frequency estimate derived from a synchronization signal (e.g., using a phase locked loop) to ensure proper frequency synchronization with the network. The same synchronization signal used to derive the reference time or a different synchronization signal can be used to calibrate the local oscillator of the UE.

Figure 9:
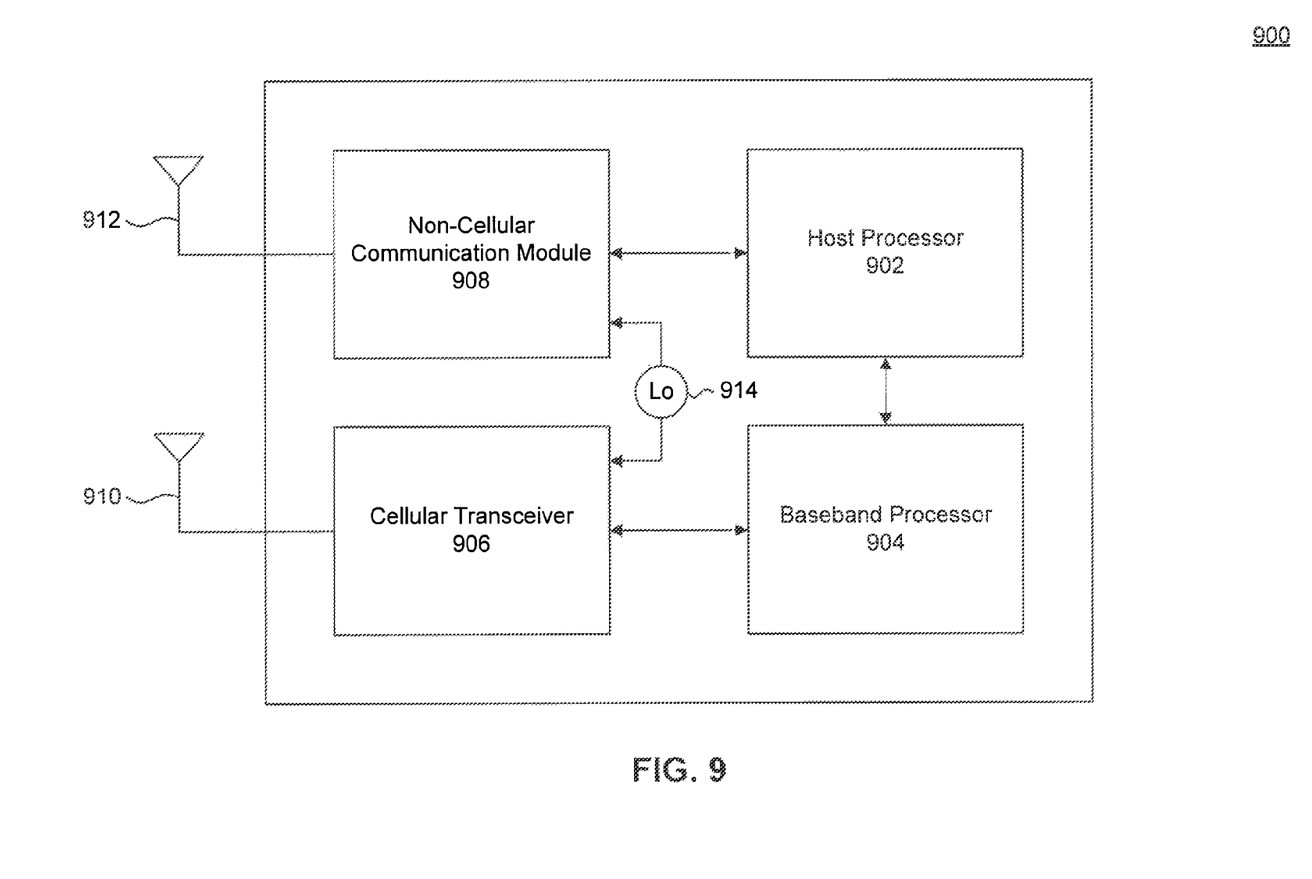
FIG. 9 illustrates an example UE according to an embodiment.

FIG. 9 illustrates an example UE 900 according to an embodiment. Example UE 900 can be an embodiment of UE 110 for example and can be used to perform embodiments. Example UE 900 includes a host processor 902, a baseband processor 904, a cellular-based transceiver 906, a non-cellular communication module 908, antennas 910 and 912, and a local oscillator (LO) 920. Host processor 902 is responsible for the general operation of UE 900, including the execution of an operating system and/or applications. Cellular-based transceiver 906 and baseband processor 904 can be used to enable communication with a cellular network. Non-cellular communication module 908 can include any non-cellular based communication module, including for example a GNSS module (e.g., GNSS receiver), a WiFi module, a Bluetooth, or other modules as would be understood by a person of skill in the art based on the teachings herein. According to embodiments, non-cellular communication module 908 can be used to derive non-cellular based synchronization signals as further described below. LO 920 is shared between cellular-based transceiver 906 and non-cellular communication module 908. As such, LO 920 can be time/frequency synchronized using a non-cellular signal and then used directly, without any modification of its timing/frequency offset, to run cellular-based transceiver. In another embodiment, two separate LOs are used for the cellular-based transceiver 906 and the non-cellular communication module 908. In such embodiment, additional circuitry can be used to synchronize, for example, the LO of the cellular-based transceiver 906 with the LO of the non-cellular communication module 908, after having synchronized the LO of the non-cellular communication module 908. In an embodiment, LO 920 is configured to produce a LO signal based on at least one of a time estimate and a frequency estimate from non-cellular communication module 908 and to provide the LO signal to the cellular-based transceiver 906.

Figure 3:
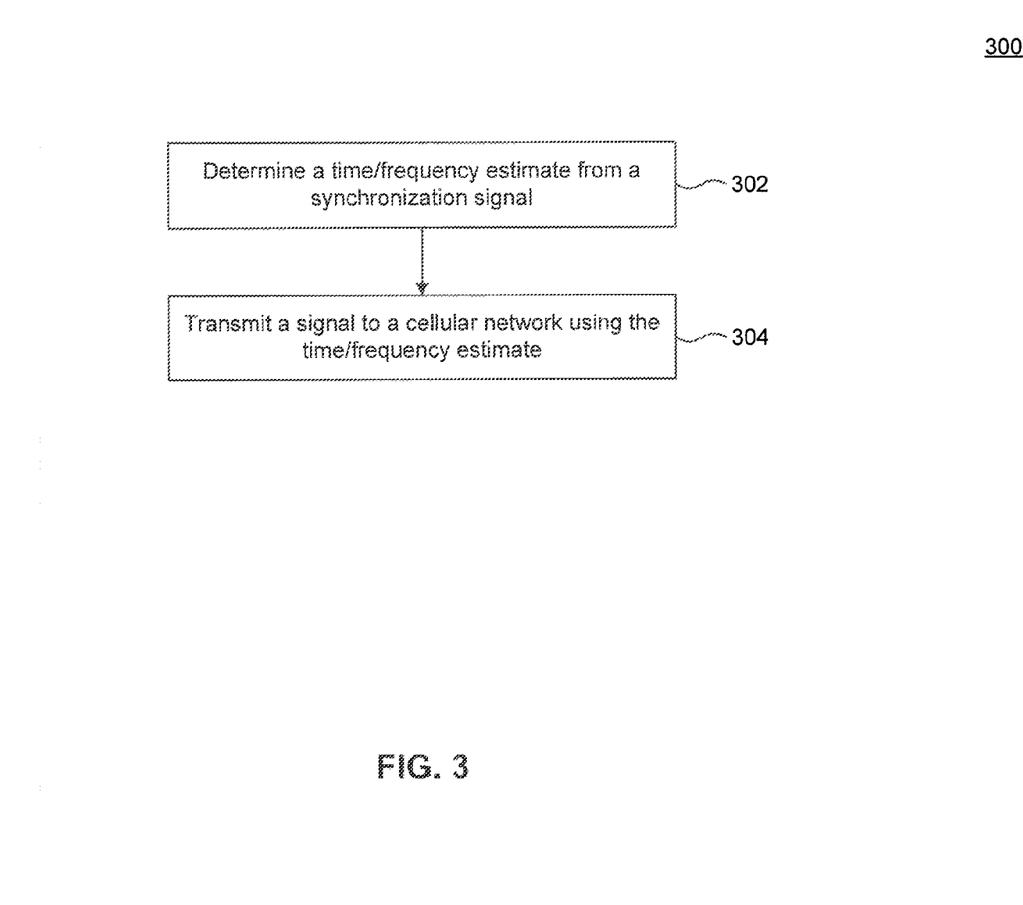
FIG. 3 is an example process for transmitting a signal from a user equipment (UE) to a cellular network according to an embodiment.

FIG. 3 illustrates an example process 300 for transmitting a signal from a UE to a cellular network according to an embodiment. Example process 300 is provided for the purpose of illustration only and is not limiting of embodiments. Example process 300 can be used by UE 110 to transmit an SOS message to the network in example environment 100, for example.

As shown in FIG. 3, process 300 begins in step 302, which includes determining at least one of a time estimate and a frequency estimate from a synchronization signal. According to embodiments, the synchronization signal can include any signal available to the UE which can be used to derive a time and/or a frequency estimate. In an embodiment, the time estimate and the frequency estimate can be determined from the same synchronization signal. In another embodiment, the time estimate and the frequency estimate are determined from different synchronization signals. In an embodiment, the time estimate includes an estimate of a reference time (e.g., GPS time, UTC, etc.) in relation to which quiet periods are scheduled by the network. The frequency estimate includes an estimate of the frequency of the synchronization signal, which can be used to calibrate a locally produced frequency of the UE.

In one embodiment, the synchronization signal is cellular-based (e.g., transmitted by the cellular network). For example, the synchronization signal can include the PSS and/or the SSS of an eNodeB of the network, which allows the UE to establish time/frequency synchronization with the network. In another embodiment, the synchronization signal is non-cellular based (e.g., not transmitted from the cellular network). For example, the synchronization signal can include a GNSS-based signal (transmitted by a GNSS satellite or a terrestrial GNSS aiding network), an atomic clock broadcast signal, a broadcast radio signal, and a broadcast television signal, for example. When the synchronization signal includes a GNSS-based signal, the UE can receive the synchronization signal from a GNSS receiver embedded in the UE. When the synchronization signal includes a terrestrial broadcast signal, the UE can receive the synchronization using its UE receiver (e.g., LTE receiver) or another dedicated receiver.

When the synchronization signal is non-cellular based, the UE does not rely on the cellular network to perform process 300. This embodiment is well suited for when the UE is either unable to attach to the network and/or does not wish to attach to the network in order to save power (typically, by attaching to the network, the UE will be required to monitor different control channels and thereby maintain its receiver powered on a substantial amount of time).

After determining the time estimate and/or the frequency estimate in step 302, process 300 proceeds to step 304, which includes transmitting a signal to the cellular network using the time estimate and/or the frequency estimate. In an embodiment, the signal includes an SOS message (or a portion thereof) intended to convey an emergency situation by the UE.

In an embodiment, transmitting the signal from the UE to the cellular network using the time estimate includes determining a transmission time of the signal based on the time estimate and a designated time period; and transmitting the signal at the transmission time. In an embodiment, the transmission time is determined to align reception of the signal by the cellular network (e.g., by at least one base station of the cellular network) with the designated time period. In an embodiment, the designated time period corresponds to a quiet period scheduled by the cellular network as described above in FIG. 2. In another embodiment, the designated time period occurs at a deterministic time offset from a predefined time instant of the reference time from which the time estimate is determined in step 302 by the UE. For example, in an embodiment, the time estimate is an estimate of GPS time and the designated time period occurs every n msec multiple of GPS time (where n is an integer). The UE can use one or more designated time periods to send the signal to the network.

In an embodiment, transmitting the signal from the UE to the cellular network using the frequency estimate includes calibrating a local oscillator of the UE using the frequency estimate; and transmitting the signal using the local oscillator on predefined frequencies.

In addition to enabling a UE to send an SOS message to the network in a time/frequency synchronous manner as described above (which significantly enhances the probability of successful reception of the SOS message by the network), embodiments provide highly robust SOS message transmission and reception schemes configured to enhance the successful detection and decoding of the SOS message by at least one base station of the cellular network. Examples of such schemes are provided below for the purpose of illustration only. As would be understood by a person of skill in the art based on the teachings herein, embodiments are not limited by these example schemes.

Figure 4:
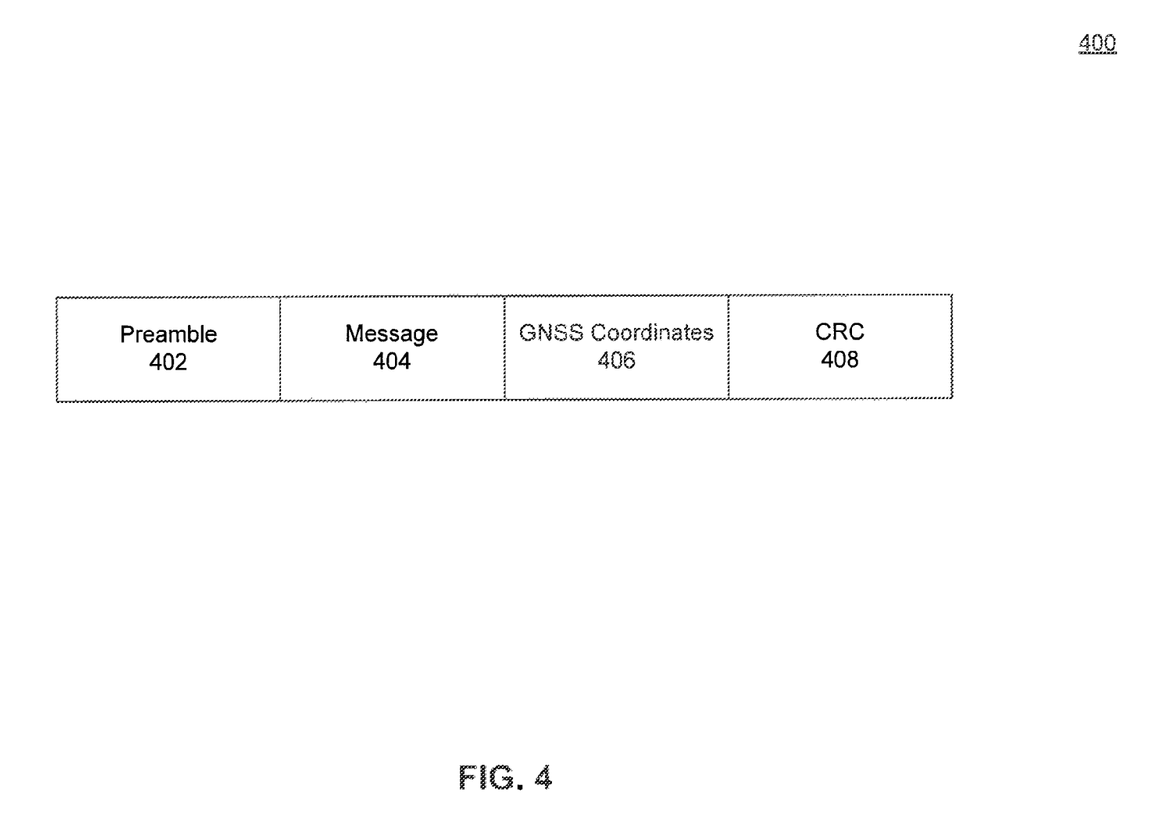
FIG. 4 illustrates an example SOS message format according to an embodiment.

FIG. 4 illustrates an example SOS message 400 according to an embodiment. Example SOS message 400 is provided for the purpose of illustration only and is not limiting of embodiments. As shown in FIG. 4, example message 400 includes a preamble field 402, a message field 404, a GNSS coordinates field 406, and a cyclic redundancy check (CRC) field 408. In an embodiment, preamble field 402, message field 404, GNSS coordinates field 406, and CRC field 408 are 64 bits, 32 bits, 64 bits, and 32 bits, respectively. In other embodiments, the SOS message fields can have different lengths, and the SOS message can include different fields than example message 400.

In an embodiment, preamble field 402 includes information designed for the network to identify SOS message 400. This information can include pilot information that is known by the network. The network can identify a received signal as an SOS message upon detecting the pilot information and can also use the pilot information to estimate the uplink channel from the UE to the base station receiving SOS message 400. Message field 404 can include a short description of the nature of the emergency that the UE is trying to convey in SOS message 400. GNSS coordinates field 406 can include an estimate of the position of the UE, which can be obtained from a GNSS receiver embedded with the UE. CRC field 408 includes redundancy check bits for detecting transmission errors in message field 404 and GNSS coordinates field 406 of SOS message 400.

Figure 5:
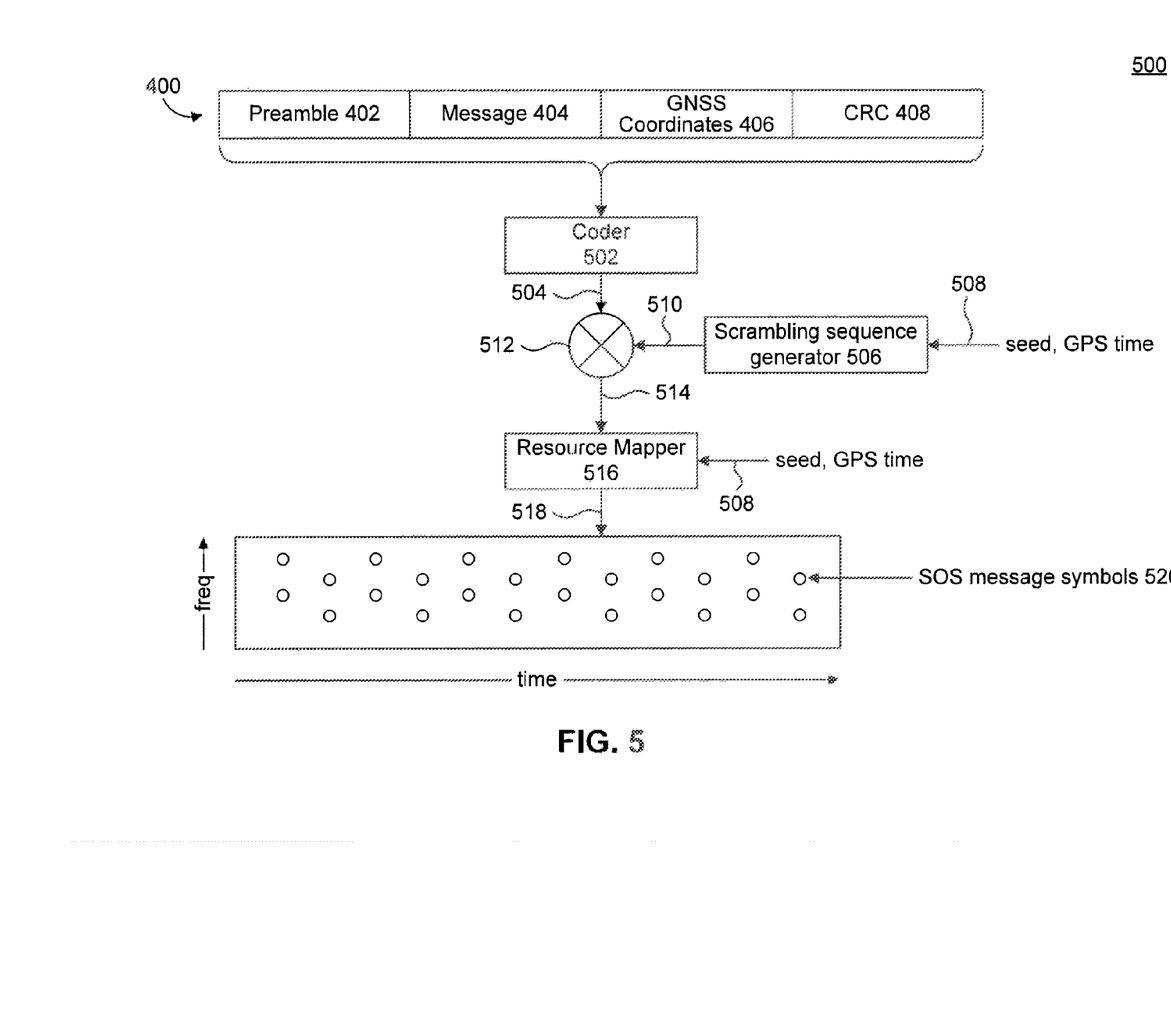
FIG. 5 illustrates example UE processing to transmit a message according to an embodiment.

FIG. 5 illustrates example UE processing 500 to transmit example SOS message 400 according to an embodiment. As would be understood by a person of skill in the art based on the teachings herein, example UE processing 500 can be used to transmit other types messages as well from the UE. Example UE processing 500 is provided for the purpose of illustration only and is not limiting of embodiments.

As shown in FIG. 5, example UE processing 500 begins with SOS message 400 being input into a coder 502 to generate an encoded message 504. In an embodiment, coder 502 is configured such that encoded message 504 includes a very low amount of systematic information (information of original SOS message 400) and a high amount of parity information, to facilitate correct decoding of the SOS message at a receiving base station. In another embodiment, coder 502 is configured such that preamble field 402 of SOS message 400 manifests itself at known bit locations of encoded message 504. For example, in an embodiment, coder 502 implements a systematic code that causes the systematic information (information of original SOS message 400) to appear first in encoded message 504. This allows for preamble field 402 to be transmitted first and detected by a receiving base station, before the rest of SOS message 400 is transmitted. In another embodiment (not shown in FIG. 5), preamble field 402 is processed separately from the rest of SOS message 400 using a first coder, the output of which is transmitted first. The rest of SOS message 400 or SOS message 400 in its entirety is then processed using a second coder to produce encoded message 504. In an embodiment, the first coder implements a lower code than the second coder, such that preamble field 402 is transmitted with more redundancy than the rest of SOS message 400.

Subsequently, example UE processing 500 includes encoded message 504 being multiplied, using a mixer 512, by a scrambling sequence 510 to generate a scrambled message 514. In an embodiment, scrambling sequence 510 is generated by a scrambling sequence generator 506 as a function of an input 508, including a random seed and current time (e.g., GPS time). The random seed introduces randomization in scrambling sequence 510 across UEs attempting to send SOS messages at the same time, thereby allowing a base station to detect SOS messages from multiple UEs at the same time (by using different scrambling sequences, selected to have low cross-correlation with each other, SOS messages from different UEs appear as noise relative to each other at the base station). In an embodiment, the random seed is selected at random from a finite number of seeds. The current time introduces randomization in scrambling sequence 510 in time for the same UE (e.g., from one radio frame to another), thus preventing the UE from repeating the same scrambling sequence. In embodiments, the length and/or periodicity of scrambling sequence 510 can be varied to result in different degrees of coding gain at a receiving base station.

In an embodiment, the seed in input 508 of scrambling sequence generator 506 follows a pseudo-deterministic scheme from one instant to another (e.g., from one radio frame to another), whereby the first chosen seed is selected at random and then each subsequently chosen seed is selected from a finite universe of seeds based on the previously chosen seed. This allows a receiving base station upon identifying the chosen seed for a received scrambled sequence to limit the search for the seed of a subsequently received scrambled sequence and/or infer the seed that was used for a previously transmitted scrambled sequence. In an embodiment, a first seed is chosen for the preamble field and a second related seed is chosen for the rest of the SOS message.

Finally, example UE processing 500 terminates with scrambled message 514 being resource mapped, using a resource mapper 516, to radio resource locations (time and frequency resource locations, such as LTE resource blocks (RBs)) for transmission to the network. In an embodiment, the quiet period is associated with a designated time period and specific frequency resources, which together define a set of potential radio resource locations. Scrambled message 514 is mapped to radio resource locations from the set of potential radio resource locations. Output 518 of resource mapper 516 includes symbols 520 of scrambled message 514 and associated radio resource locations for their transmission. In an embodiment, the mapping of scrambled message 514 using resource mapper 516 is responsive to the same input 508 (including the random seed and current time) as used for generating scrambling sequence 510. This allows randomization across UEs and over time per UE of the radio resources used to transmit SOS messages.

Figure 6:
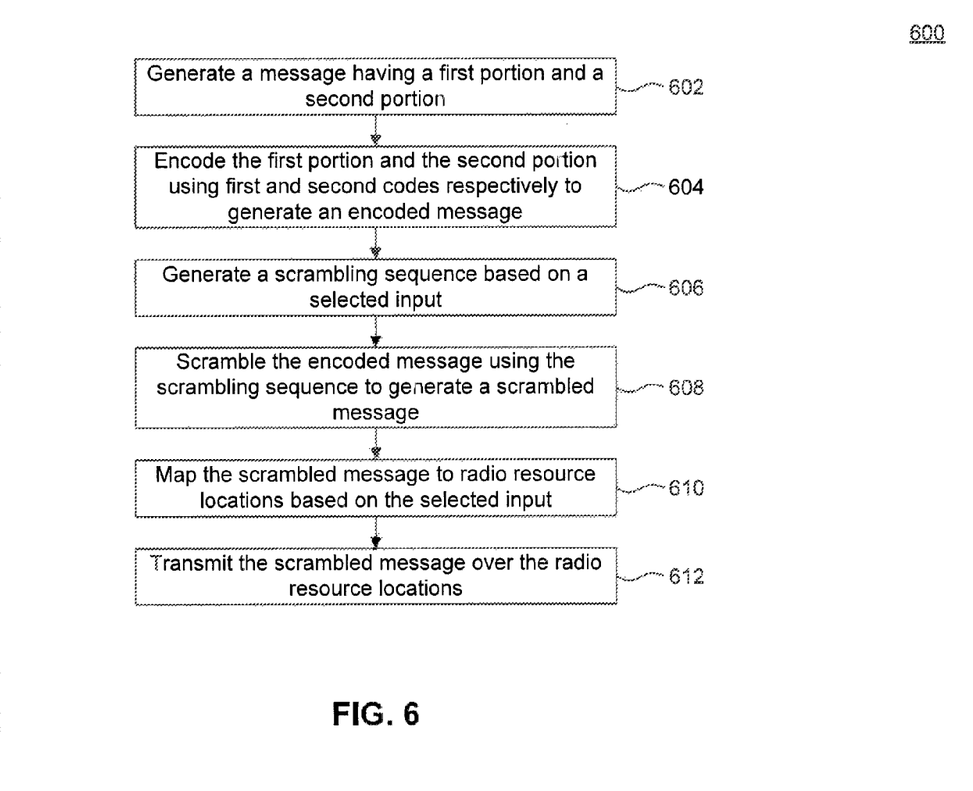
FIG. 6 is an example process for transmitting a message from a UE to a cellular network according to an embodiment.

FIG. 6 is an example process 600 for transmitting an SOS message from a UE to a cellular network according to an embodiment. Example process 600 can be used by the UE to transmit SOS message 400, for example, to the cellular network. As would be understood by a person of skill in the art based on the teachings herein, however, example process 600 can also be used to transmit other types of message from the UE to the cellular network. Example process 600 is provided for the purpose of illustration only and is not limiting of embodiments.

As shown in FIG. 6, process 600 begins in step 602, which includes generating a message having a first portion and a second portion. For example, the message can be an SOS message, such as SOS message 400, having a preamble portion and an information portion (e.g., message, GNSS coordinates, and CRC). The preamble portion can include pilot information. The information portion can include an emergency message.

Subsequently, process 600 proceeds to step 604, which includes encoding the first portion and the second portion of the message using first and second codes respectively to generate an encoded message. In an embodiment, the first and second codes are the same. In another embodiment, the first code has a lower rate than the second code. As such, the first portion has a higher coding gain associated with it than the second portion in the encoded message. In an embodiment, step 604 is performed by one or more coders of the UE, such as coder 502 described above in FIG. 5.

Then, in step 606, process 600 includes generating a scrambling sequence based on a selected input. In an embodiment, the selected input includes a random seed and a current time. This allows randomization of the scrambling sequence across UEs attempting to send messages at the same time and over time for the same UE (e.g., from one radio frame to another). In an embodiment, step 606 is performed by a scrambling sequence generator, such as scrambling sequence generator 506 described above in FIG. 5.

Subsequently, process 600 proceeds to step 608, which includes scrambling the encoded message using the scrambling sequence to generate a scrambled message. In an embodiment, step 608 includes multiplying the encoded message with the scrambling sequence using a multiplier, such as multiplier 512 described above in FIG. 5.

Then, in step 610, process 600 includes mapping the scrambled message to radio resource locations based on the selected input. In an embodiment, the radio resource locations include time and frequency resource locations (e.g., LTE RBs) selected from a set of potential radio resource locations, defined by a designated time period and associated specific frequency resources. In an embodiment, the designated time period and associated specific frequency resources correspond to a quiet period as described above. Mapping the scrambled message to radio resources based on the selected input allows randomization across UEs and over time per UE of the radio resources used to transmit messages to the cellular network. Finally, process 600 terminates in step 612, which includes transmitting the scrambled message over the radio resource locations selected in step 610.

Example SOS message reception schemes are now provided for the purpose of illustration only. As would be understood by a person of skill in the art based on the teachings herein, embodiments are not limited by these example schemes. These example schemes can be performed by a base station (e.g., eNodeB) to attempt to detect and/or to receive and decode an SOS message transmitted by a UE.

Figure 7:
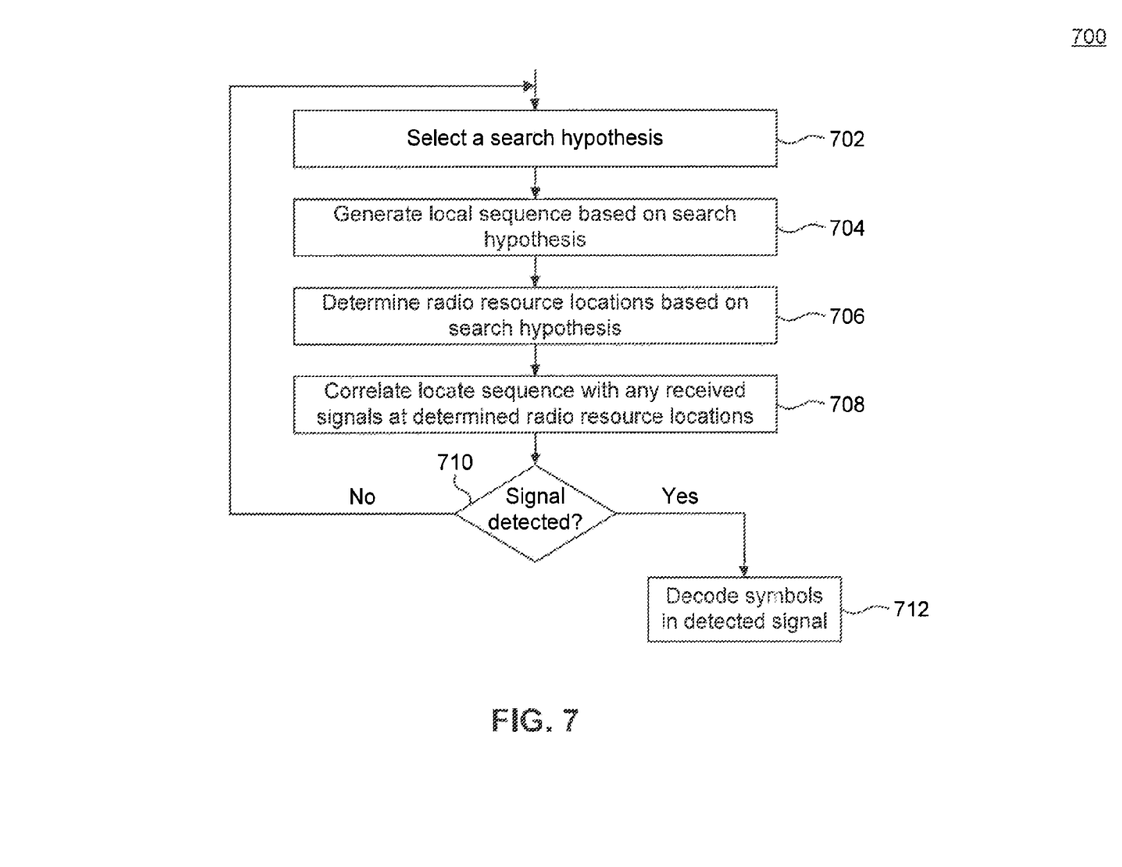
FIG. 7 is an example process for detecting a message from a UE by a base station according to an embodiment.

FIG. 7 is an example process 700 for detecting an SOS message from a UE by a base station according to an embodiment. Example process 700 can be used by the base station to detect an SOS message transmitted by the UE in accordance with the above described embodiments, such as example UE processing 500 and example process 600 described above in FIGS. 5 and 6 respectively. As would be understood by a person of skill in the art based on the teachings herein, however, example process 700 can also be used to detect other types of message from the UE.

As shown in FIG. 7, process 700 begins in step 702, which includes selecting a search hypothesis. In an embodiment, as described above, the SOS message is scrambled at the UE using a scrambling sequence generated based on a random seed and the current time. The random seed is chosen at random from a finite number of seeds. Selecting the search hypothesis thus includes selecting a hypothesis regarding the seed chosen at the UE.

Subsequently, process 700 proceeds to step 704, which includes generating a local sequence based on the search hypothesis. In an embodiment, the local sequence corresponds to the scrambling sequence that would have been generated at the UE based on the selected seed hypothesis and the current time. In an embodiment, it is assumed that the randomization over time introduced by using the current time in generating the scrambling sequence at the UE is sufficiently slow compared to the propagation time of the SOS message from the UE to the base station, such that the base station can apply the current time at the base station to generate the local sequence. In another embodiment, the base station accounts for the propagation time of the SOS message from the UE to the base station to estimate the time at the UE when the scrambling sequence was generated.

Then, in step 706, process 700 includes determining radio resource locations based on the search hypothesis. In an embodiment, as described above, the scrambled SOS message is mapped to radio resource locations at the UE based on the same random seed and current time used to generate the scrambling sequence. Accordingly, step 706 includes determining the radio resource locations that the scrambled SOS message would have been mapped to at the UE based on the selected seed hypothesis and the current time. The radio resource locations, as described above, include time and frequency resource locations, such as LTE RBs, for example.

Subsequently, process 700 proceeds to step 708, which includes correlating the local sequence generated in step 704 with any received signals at the radio resource locations determined in step 706 to generate a correlation result. The correlation result depends on whether or not a UE is transmitting an SOS message over the determined radio resource locations. In an embodiment, the correlation is performed over a plurality of radio frames, accumulating correlation values to generate the correlation result. In another embodiment, the correlation is performed over only the preamble portion of the SOS message before proceeding to step 710.

Subsequently, the correlation result is compared to a predetermined threshold in step 710 to determine whether or not a signal is detected over the radio resource locations determined in step 706. Specifically, if the correlation result is below the predetermined threshold, then it is determined that no signal has been detected over the radio resource locations determined at step 706 (and that the search hypothesis selected in step 702 is false) and process 700 returns to step 702 to select a new search hypothesis. Otherwise, if the correlation result is above the predetermined threshold, then it is determined that a signal has been detected over the radio resource locations determined at step 706 (and that the search hypothesis selected in step 702 is true) and process 700 proceeds to step 712, which includes decoding any symbols present in the detected signal. In another embodiment, where the correlation in step 708 is performed over only the preamble portion of the SOS message, process 700 can further include acquiring the rest of the SOS message using the seed hypothesis selected in step 702 and over the radio resource locations determined in step 706.

Figure 8:
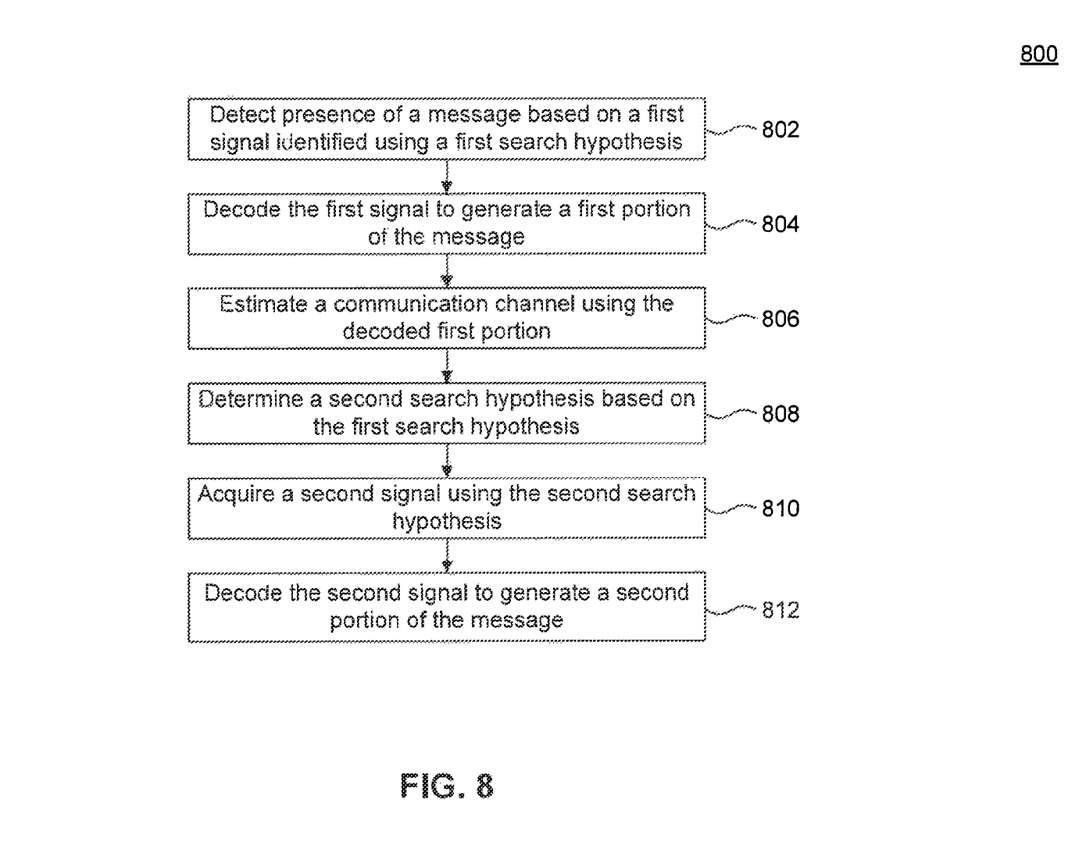
FIG. 8 is an example process for receiving a message from a UE by a base station according to an embodiment.

FIG. 8 is an example process 800 for receiving an SOS message from a UE by a base station according to an embodiment. In an embodiment, the UE is not attached to the network. Example process 800 can be used by the base station to receive an SOS message transmitted by the UE in accordance with the above described embodiments, such as example UE processing 500 and example process 600 described above in FIGS. 5 and 6 respectively. As would be understood by a person of skill in the art based on the teachings herein, however, example process 800 can also be used to receive other types of message from the UE by the base station.

As shown in FIG. 8, process 800 begins in step 802, which includes detecting the presence of the SOS message based on a first signal identified using a first search hypothesis. In an embodiment, step 802 includes performing example process 700, for example, to detect the presence of an SOS message. In an embodiment, the first signal corresponds to received signals detected over radio resource locations determined based on the first search hypothesis. In an embodiment, the first search hypothesis includes a hypothesis regarding one or more of a scrambling sequence of the message (scrambling sequence used to scramble the message at the UE before transmission) and a radio resource mapping of the message. In another embodiment, the first search hypothesis includes a hypothesis regarding one or more of a scrambling sequence and a radio resource mapping of a portion of the message (e.g., preamble).

Subsequently, process 800 proceeds to step 804, which includes decoding the first signal to generate a first portion of the SOS message. In an embodiment, the first signal corresponds to the transmission of a scrambled coded preamble of the SOS message by the UE, and the first portion corresponds to pilot information (e.g., pilot symbols) contained in the preamble of the SOS message. In an embodiment, the pilot information is designed for the network to identify the SOS message (to recognize that the message is an SOS message) and is known by the network.

Then, in step 806, process 800 includes estimating a communication channel using the decoded first portion of the SOS message. In an embodiment, step 806 includes estimate the uplink communication channel from the UE to the base station receiving the SOS message by comparing the pilot information contained in the decoded first portion of the message with corresponding locally stored pilot information.

Subsequently, process 800 proceeds to step 808, which includes determining a second search hypothesis based on the first search hypothesis. In an embodiment, the second search hypothesis is the same as the first search hypothesis and therefore step 808 is omitted. In another embodiment, the second search hypothesis is related to the first search hypothesis in a deterministic or pseudo-deterministic fashion. For example, in an embodiment, as described above, the UE selects the random seed for generating the scrambling sequence according to a pseudo-deterministic scheme from one instant to another (e.g., from one radio frame to another), whereby the first chosen seed is selected at random and then each subsequently chosen seed is selected from a finite universe of seeds based on the previously chosen seed. For example, a first seed can be chosen for the preamble field of the SOS message and a second related seed can be chosen for the rest of the SOS message.

Accordingly, in process 800, with the first seed hypothesis being true in step 802 (because the presence of the SOS message was detected based on the first seed hypothesis), step 808 includes determining the second search hypothesis based on the first search hypothesis by applying the same deterministic or pseudo-deterministic scheme used by the UE. In an embodiment, where the seeds follow a pseudo-deterministic scheme, step 808 further includes a search over a finite number of search hypotheses to determine the second search hypothesis. Otherwise, if the seeds follow a deterministic scheme, no search is required and the second search hypothesis can be immediately determined from the first search hypothesis.

Then, in step 810, process 800 includes acquiring a second signal using the second search hypothesis. In an embodiment, the second signal corresponds to received signals detected over radio resource locations determined based on the second search hypothesis. In an embodiment, the second search hypothesis includes a hypothesis regarding one or more of a scrambling sequence of the message (scrambling sequence used to scramble the message at the UE before transmission) and a radio resource mapping of the message. In another embodiment, the second search hypothesis includes a hypothesis regarding one or more of a scrambling sequence and a radio resource mapping of a portion of the message (e.g., the rest of the SOS message without the preamble).

Finally, process 800 proceeds to step 812, which includes decoding the second signal to generate a second portion of the SOS message. In an embodiment, step 812 further includes decoding the second signal, using the communication channel estimate determined in step 806, to generate the second portion of the SOS message. In an embodiment, the second signal corresponds to the transmission of a post-preamble part of the SOS message by the UE, and the second portion corresponds to information (e.g., emergency message, GNSS coordinates, CRC) contained in the post-preamble part of the SOS message.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for transmitting an emergency signal from a user equipment (UE) to a cellular network, comprising:
   determining, by the UE, at least one of a time estimate and a frequency estimate from a non-cellular synchronization signal; and
   transmitting the emergency signal from the UE to the cellular network using at least one of the time estimate and the frequency estimate, wherein transmitting the emergency signal from the UE to the cellular network using the time estimate comprises:
      determining a transmission time of the emergency signal based on the time estimate and a designated time period; and
      transmitting the emergency signal at the transmission time, wherein the transmission time is determined to align reception of the emergency signal by the cellular network with the designated time period,
   wherein the designated time period corresponds to a quiet time period over associated frequency resources scheduled by the cellular network, and
   wherein transmission from user equipments (UEs) served by the cellular network is halted during the quiet time period.

2. The method of claim 1, wherein the non-cellular synchronization signal includes one of: a Global Navigation Satellite System (GNSS) signal, an atomic clock broadcast signal, a broadcast radio signal, and a broadcast television signal.

3. The method of claim 1, wherein the designated time period occurs at a deterministic time offset from a time instant of a reference time.

4. The method of claim 3, wherein the reference time is Coordinated Universal Time (UTC) or Global Positioning System (GPS) time.

5. The method of claim 3, wherein the non-cellular synchronization signal provides the reference time.

6. The method of claim 1, wherein transmitting the emergency signal from the UE to the cellular network using the frequency estimate comprises:
   calibrating a local oscillator of the UE using the frequency estimate; and
   transmitting the emergency signal using the local oscillator on predefined frequencies.

7. The method of claim 6, wherein the predefined frequencies are variable as a function of time and a random seed.

8. The method of claim 1, wherein the UE is not attached to the cellular network.

* * * * *